United States Patent
Tang et al.

(10) Patent No.: US 10,969,280 B2
(45) Date of Patent: Apr. 6, 2021

(54) TEMPERATURE MEASUREMENT CORRECTION METHOD, ELECTRONIC SYSTEM AND METHOD OF GENERATING CORRECTION REGRESSION COEFFICIENT TABLE

(71) Applicant: National Chung-Shan Institute of Science and Technology, Taoyuan (TW)

(72) Inventors: Shiang-Feng Tang, Taoyuan (TW); Shun-Lung Yen, Taoyuan (TW); Kun-Chi Lo, Taoyuan (TW); Wen-Jen Lin, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 300 days.

(21) Appl. No.: 16/122,890

(22) Filed: Sep. 6, 2018

(65) Prior Publication Data

US 2019/0195694 A1 Jun. 27, 2019

(30) Foreign Application Priority Data

Dec. 26, 2017 (TW) .................................. 106145603

(51) Int. Cl.
*G01J 5/00* (2006.01)
*G01J 5/56* (2006.01)
(Continued)

(52) U.S. Cl.
CPC . *G01J 5/56* (2013.01); *G01J 5/06* (2013.01); *G01J 5/24* (2013.01); *G01J 5/522* (2013.01);
(Continued)

(58) Field of Classification Search
CPC ......... H04N 5/33; H04N 5/3655; G01J 5/522; G01J 5/22; G01J 5/20; G01J 2005/0048;
(Continued)

(56) References Cited

U.S. PATENT DOCUMENTS 5,150,969 A * 9/1992 Goldberg .................. G01J 5/02
374/128
8,235,590 B2 * 8/2012 Sheard ................. H04N 5/2253
374/130

(Continued)

*Primary Examiner* — Gail Kaplan Verbitsky
(74) *Attorney, Agent, or Firm* — Winston Hsu

(57) ABSTRACT

A temperature measurement correction method for a temperature detection device is provided. The temperature detection device includes a case and a focal plane array module disposed on an inner of the case. The temperature measurement correction method includes measuring an ambient temperature, a temperature of the case and a temperature of the focal plane array module, determining a plurality of radiometric regression coefficients according to the ambient temperature, the temperature of the case and the temperature of the focal plane array module, utilizing the temperature detection device to sense infrared energy radiated from an object to generate an electrical signal, and calculating an actual temperature value of the object according to the plurality of radiometric regression coefficients and the electrical signal.

10 Claims, 6 Drawing Sheets

(51) Int. Cl.
*G01J 5/24* (2006.01)
*G01J 5/52* (2006.01)
*G01J 5/06* (2006.01)
*G01N 21/27* (2006.01)

(52) U.S. Cl.
CPC .................. *G01J 2005/0048* (2013.01); *G01J 2005/0077* (2013.01); *G01J 2005/068* (2013.01); *G01N 21/274* (2013.01)

(58) Field of Classification Search
CPC ......... G01J 2005/0077; G01J 2005/068; G01J 2005/0081; G01J 5/00; G01K 13/00; G01K 15/00; G01K 15/005; G01N 21/274; G01N 21/35; A61B 6/582
See application file for complete search history.

(56) References Cited

U.S. PATENT DOCUMENTS

| | | | |
|---|---|---|---|
| 8,274,050 B2* | 9/2012 | Grimberg | G01J 5/522 250/338.1 |
| 8,374,821 B2* | 2/2013 | Rousselle | G06F 30/00 702/130 |
| 10,079,982 B2* | 9/2018 | Boulanger | H04N 5/33 |
| 10,325,370 B1* | 6/2019 | Jabari | G06T 7/0079 |
| 10,389,953 B2* | 8/2019 | Hoelter | H04N 5/2253 |
| 2002/0074499 A1* | 6/2002 | Butler | G01J 5/20 250/338.1 |
| 2008/0179520 A1* | 7/2008 | Kauffman | H04N 5/33 250/332 |
| 2009/0272888 A1* | 11/2009 | Nugent | G01D 18/00 250/252.1 |
| 2014/0232875 A1* | 8/2014 | Boulanger | H04N 5/33 348/164 |
| 2014/0267763 A1* | 9/2014 | Neal | H04N 5/33 348/164 |
| 2014/0378843 A1* | 12/2014 | Valdes | G02B 21/36 600/476 |
| 2017/0211993 A1* | 7/2017 | Larsen | G01J 5/0011 |
| 2019/0228512 A1* | 7/2019 | Kurihara | H04N 9/646 |
| 2019/0298183 A1* | 10/2019 | Burg | A61B 7/003 |
| 2019/0339589 A1* | 11/2019 | Kostrzewa | H04N 5/33 |

* cited by examiner

| Measurement environment: ambient temperature $T_{A1}$ is at 19.2°C ; temperature $T_{C1}$ of case 102 is at 23.32°C ; temperature $T_{F1}$ of FPA module 104 is at 22°C | | | |
|---|---|---|---|
| Temperature of Black-body radiation source | Average voltage value $V_D$ (counts) | Temperature calculated by inverse operation | |
| 20°C | 3108.75 | 19.99°C | |
| 30°C | 3646.75 | 30.08°C | |
| 40°C | 4237.50 | 40.18°C | |
| 50°C | 4866.75 | 50.06°C | |
| Correction radiometric regression coefficients | R | O | B | F |
| | 392760 | 83.5158 | 1428 | 1 |

FIG. 5

| Measurement environment: ambient temperature $T_{A1}$ is at 18.8°C ; temperature $T_{C1}$ of case 102 is at 23.76°C ; temperature $T_{F1}$ of FPA module 104 is at 22.4°C | | | |
|---|---|---|---|
| Temperature of Black-body radiation source | Average voltage value $V_D$ (counts) | Temperature calculated by inverse operation | |
| 25°C | 3550 | 24.8°C | |
| 50°C | 4873.5 | 50.49°C | |
| 75°C | 6414.25 | 75.07°C | |
| 100°C | 8311.25 | 100.798°C | |
| Correction radiometric regression coefficients | R | O | B | F |
| | 338281 | 729.066 | 1428 | 1 |

FIG. 6

TEMPERATURE MEASUREMENT CORRECTION METHOD, ELECTRONIC SYSTEM AND METHOD OF GENERATING CORRECTION REGRESSION COEFFICIENT TABLE

BACKGROUND OF THE INVENTION

1. Field of the Invention

The present invention relates to a temperature measurement correction method, an electronic system and a method of generating correction regression coefficient table, and more specifically to a temperature measurement correction method, electronic system and method of generating correction regression coefficient table capable of improving the measurement accurately.

2. Description of the Prior Art

Infrared in the prior art possesses strong transmittance and is able to be applied in a great variety of aspects, such as communication, medical, probing, military, etc. For applications not related to the atmospheric window, the infrared is usually utilized in a gas sensor to sense the absorption wavelengths of particular gases and further determine whether there is gas leaking according to the gas concentration. If the infrared is applied in an imaging system, the selected wavelength of the infrared is usually between 8 micrometers and 15 micrometers because the infrared within the waveband needs no further irradiation and can be used at room temperature without additional cooling processes to suppress noise. Moreover, the peak of the black body radiation wavelength from a human is around 10 micrometers. Thus, the infrared is able to be applied to military purposes of shooting combat for a single soldier at night, and for the purposes of people's livelihood, the infrared can be applied to vision assistance on automobile electronics at night, for example, auto-piloting. Therefore, infrared sensing technology has been widely used in various fields.

An uncooled thermal camera usually uses a focal plane array of a microbolometer to receive thermal radiation energy and a readout circuit measures the corresponding electrical signal according to the resistance change produced by variations of the component characteristics in the focal plane array. The measured corresponding electrical signal is used for calculating the actual measured temperature. However, the measurement error of the measured electrical signal due to the process variations of the sensor and the influence of the focal plane array temperature may cause inaccurate temperature measurements.

A conventional shutter-based offset correction method controls the switch operation of the optical shutter to improve thermal drift influence and measurement accuracy. However, the drawback of the conventional shutter shutter-based offset correction method is that requires additional shutter hardware for performing correction in a small size sensor. Another offset correction method is shutter-less offset correction method. The conventional shutter-less offset correction method needs to calculate multi-order equations (e.g., multiple 2-order and 3-order equations) for correcting the temperature measurement drift caused by different thermal factors. However, calculating the complex equations requires consuming much system resource and computation time. Thus, there is a need for improvement of the prior art.

SUMMARY OF THE INVENTION

It is therefore a primary objective of the present invention to provide a temperature measurement correction method, an electronic system and a method of generating correction regression coefficient table capable of improving the measurement accurately, so as to solve the above mentioned problems.

The present invention provides a temperature measurement correction method, for a temperature detection device, the temperature detection device comprising a case and a focal plane array module disposed on an inner of the case, the temperature measurement correction method comprising: measuring an ambient temperature, a temperature of the case and an operation temperature of the focal plane array module; determining a plurality of radiometric regression coefficients according to the ambient temperature, the temperature of the case and the operation temperature of the focal plane array module; utilizing the temperature detection device to sense infrared energy radiated from an object to generate an electrical signal; and calculating an actual temperature value of the object according to the plurality of radiometric regression coefficients and the electrical signal.

The present invention further provides an electronic system, comprising: a first temperature detection device, comprising: a case; and a focal plane array module, disposed on an inner of the case, comprising: a focal plane array comprising a plurality of infrared sensors for sensing infrared energy radiated from an object; and a readout circuit, for generating an electrical signal in response to the sensed infrared energy sensed by the infrared sensor of the focal plane array; a second temperature detection device, for measuring an ambient temperature, a temperature of the case and an operation temperature of the focal plane array module; and a processor circuit, for determining a plurality of radiometric regression coefficients according to the ambient temperature, the temperature of the case and the operation temperature of the focal plane array module, and calculating an actual temperature value of the object according to the plurality of radiometric regression coefficients and the electrical signal.

The present invention further provides a method of generating a correction regression coefficient table, for a temperature detection device, the temperature detection device comprising a case and a focal plane array module disposed on an inner of the case, the method comprising: in the same measurement environment, utilizing the temperature detection device to measure objects at different temperatures to generate a plurality of electronic signal; calculating radiometric regression coefficients corresponding to measurement environment according to the plurality of electronic signals and a black body radiation equation; and storing the radiometric regression coefficients corresponding to measurement environment so as to establish a correction regression coefficient table.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 and FIG. 6 are schematic diagrams illustrating the measurement environment, the correction radiometric regression coefficients and the calculated temperature according to embodiments of the present invention.

DETAILED DESCRIPTION

Figure 1:
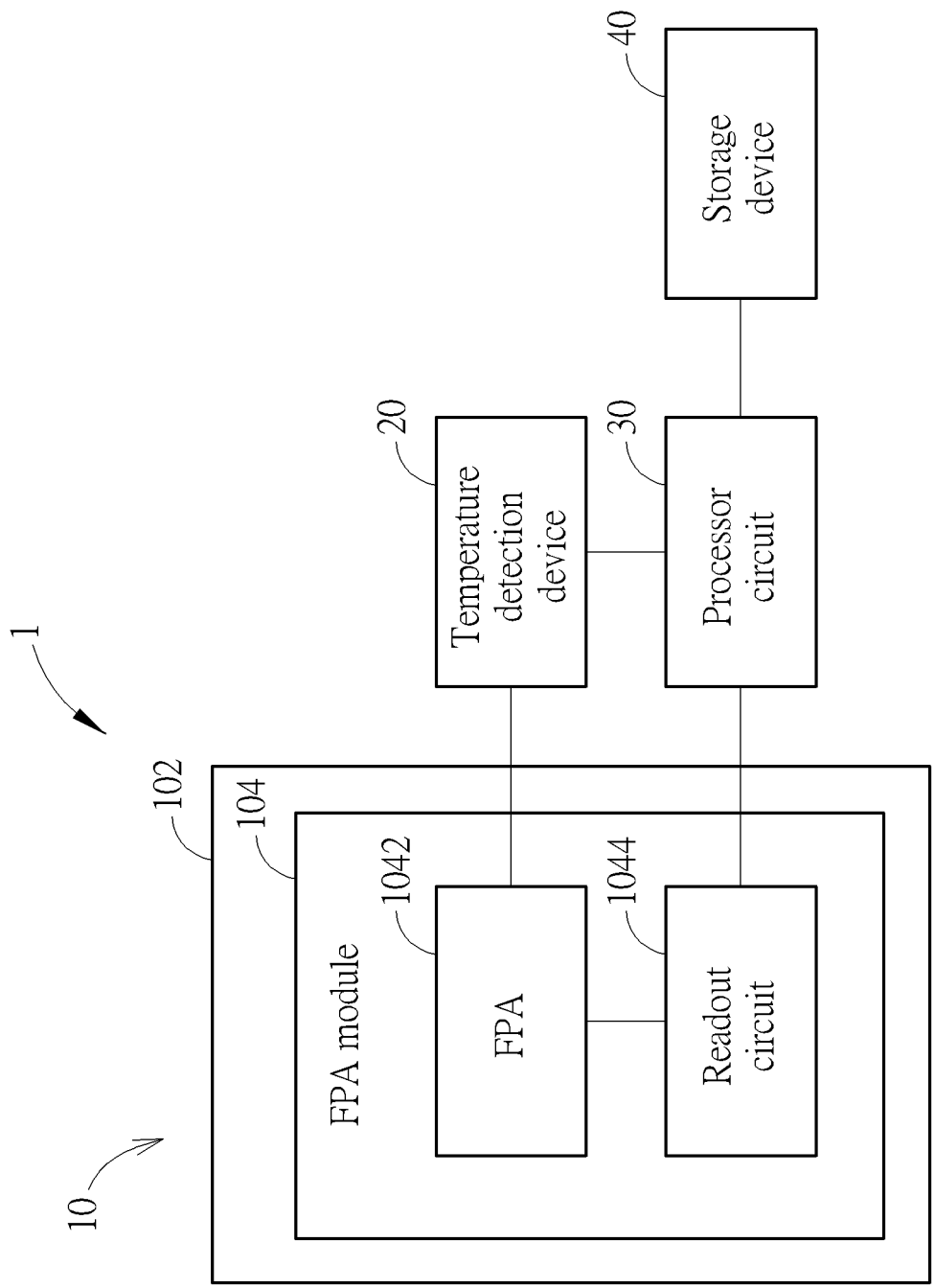
FIG. 1 is a schematic diagram of an electronic system according to an embodiment of the present invention.

Please refer to FIG. 1, which is a schematic diagram of an electronic system 1 according to an embodiment of the present invention. The electronic system 1 includes temperature detection devices 10 and 20, a processor circuit 30 and a storage device 40. The temperature detection device 10 includes a case 102 and a focal plane array (FPA) module 104. The FPA module 104 is disposed on an inner of the case 102. The case 102 is utilized for supporting the FPA module 104. The FPA module 104 includes an FPA 1042 and a readout circuit 1044. The FPA 1042 includes a plurality of infrared (IR) sensors (not shown in figures). The IR sensors of the FPA 1042 can be utilized for sensing infrared energy radiated from an object. The readout circuit 1044 is utilized for generating an electrical signal in response to the sensed infrared energy sensed by the IR sensor of the FPA 1042.

For example, the IR sensor of the FPA 1042 absorbs infrared energy radiated from an object under test and characteristics of the IR sensor may change in response to the absorbed infrared energy. Accordingly, the readout circuit 1044 generates a corresponding electrical signal according to the infrared energy sensed by the IR sensor. The electrical signal generated by the readout circuit 1044 may be a voltage signal, a current signal or any other electrical signal. The electrical signal generated by the readout circuit 1044 can be provided to the processor circuit 30 for the following operation. The electrical signal generated by the readout circuit 1044 can also be converted to a digital signal magnitude (amplitude) value for the following operation. The temperature detection device 10 can be an uncooled thermal camera. The temperature detection device 10 can be a microbolometer-based sensor device, and the IR sensor of the FPA 1042 can be a microbolometer sensor, but not limited thereto. In addition, the temperature detection device 10 can be a cooled thermal camera.

The temperature detection device 20 is utilized for measuring an ambient temperature, a temperature of the case 102 and an operation temperature of the FPA module 104. For example, the temperature of the case 102 can be an internal temperature or an external temperature of the case 102 of the temperature detection device 10. The operation temperature of the FPA module 104 can be a temperature of the internal component of the IR sensor of the FPA 1042, a temperature of the internal component of the readout circuit 1044 or a temperature of the related component of the FPA module 104. In addition, the temperature detection device 20 may include at least one temperature sensor for measuring the ambient temperature, the temperature of the case 102 and the operation temperature of the FPA module 104. For example, the temperature detection device 20 includes a temperature sensor for measuring the ambient temperature, the temperature of the case 102 and the operation temperature of the FPA module 104. For example, according to actual measurement environment requirements, the temperature detection device 20 may include a plurality of temperature sensors respectively disposed on at least one of the environment of the electronic system 1, the case 102 and the FPA module 104 for measuring the ambient temperature, the temperature of the case 102 and the operation temperature of the FPA module 104. The temperature detection device 20 can be thermocouple sensor, a resistance temperature sensor (RTD), a thermistor sensor or combinations thereof, but not limited thereto. In an embodiment, compared with the temperature detection device 10, the temperature detection device 20 can be implemented by using low cost sensors.

The processor circuit 30 is utilized for determining a plurality of radiometric regression coefficients according to the ambient temperature, the temperature of the case 102 and the temperature of the FPA module 104 and calculating an actual temperature value of the object under test according to the plurality of radiometric regression coefficients and the electrical signal generated by the temperature detection device 10. The storage device 40 is utilized for storing a correction regression coefficient table. The correction regression coefficient table stores radiometric regression coefficients corresponding to the combinations of the ambient temperature, the temperature of the case 102 and the operation temperature of the FPA module 104.

In brief, the electronic system 1 of the embodiments can adjust the radiometric regression coefficients according to the ambient temperature, the temperature of the case 102 and the temperature of the FPA module 104 and accordingly calculate an actual temperature value of the object under test, so as to reduce the sensor offset of the temperature detection device 10 and improve the accuracy of measurement.

Figure 2:
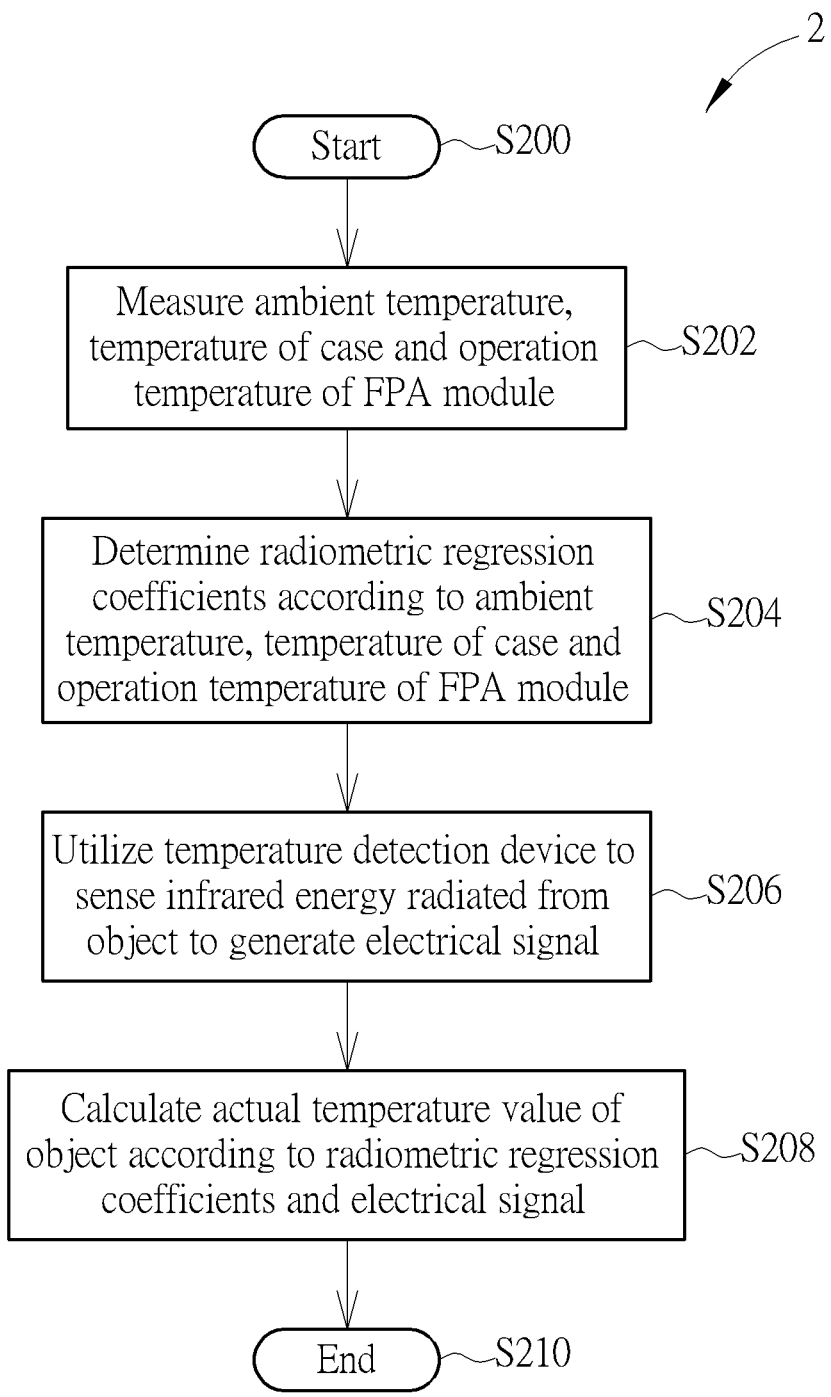
FIG. 2 is a schematic diagram of a temperature correction procedure according to an embodiment of the present invention.

For an illustration of the operations of the electronic system 1, please refer to FIG. 2. FIG. 2 is a schematic diagram of a procedure 2 according to an exemplary embodiment of the invention. The procedure 2 includes the following steps:

Step S200: Start.

Step S202: Measure an ambient temperature, a temperature of the case 102 and an operation temperature of the FPA module 104.

Step S204: Determine radiometric regression coefficients according to the ambient temperature, the temperature of the case 102 and the operation temperature of the FPA module 104.

Step S206: Utilize the temperature detection device 10 to sense infrared energy radiated from an object to generate an electrical signal.

Step S208: Calculate an actual temperature value of the object according to the radiometric regression coefficients and the electrical signal.

Step S210: End

According to the procedure 2, in Step S202, the temperature detection device 20 measures an ambient temperature, a temperature of the case 102 and an operation temperature of the FPA module 104, and the measured ambient temperature, the measured temperature of the case 102 and the measured operation temperature of the FPA module 104 can be provided to the processor circuit 30.

In Step S204, the processor circuit 30 determines radiometric regression coefficients (e.g., radiometric regression coefficients R, B, F and O) according to the ambient temperature, the temperature of the case 102 and the operation temperature of the FPA module 104. For example, the processor circuit 30 determines radiometric regression coefficients according to a preset correction regression coefficient table, and the ambient temperature, the temperature of the case 102 and the operation temperature of the FPA module 104 measured by the temperature detection device 20 in Step S202. For example, the storage device 40 stores a correction regression coefficient table. The correction regression coefficient table includes radiometric regression coefficients for each set of the ambient temperature, the temperature of the case 102 and the operation temperature of the FPA module 104.

The correction regression coefficient table is associated with a calculation result calculated based on that the electrical signals are generated when the temperature detection device measures the objects at different temperatures and at least one of radiometric regression coefficients is set as a fixed value. Therefore, the processor circuit 30 can query the correction regression coefficient table to obtain (read) the radiometric regression coefficients corresponding to the ambient temperature, the temperature of the case 102 and the operation temperature of the FPA module 104 measured by the temperature detection device 20 measured in Step S202. In other words, the processor circuit 30 can select different radiometric regression coefficients depending on the temperature information of the ambient temperature, the temperature of the case 102 and the operation temperature of the FPA module 104.

In Step S206, the temperature detection device 10 is configured to sense infrared energy radiated from the object under test to generate an electrical signal. That is, under such an environment that the ambient temperature, the temperature of the case 102 and the operation temperature of the FPA module 104 are measured by the temperature detection device 20 in Step S202, the temperature detection device 10 senses infrared energy radiated from the object under test and accordingly generates the electrical signal.

In Step S208, the processor circuit 30 is configured to calculate the actual temperature value of the object under test according to the plurality of the radiometric regression coefficients obtained in Step S204 and the electrical signal generated by the temperature detection device 10 in Step S206. For example, suppose the processor circuit 30 determines four radiometric regression coefficients R, B, F, O according to the ambient temperature, the temperature of the case 102 and the operation temperature of the FPA module 104. After that, the IR sensors of the FPA 1042 absorb infrared energy radiated from the object under test. The readout circuit 1044 generates a voltage signal according to the sensed infrared energy sensed by the IR sensors and the generated voltage signal is converted to a digital measured voltage value $V_D$. The actual temperature value $T_O$ of the object under test can be calculated by the processor circuit 30 according to the Planck curve approximate equation. The Planck curve approximate equation can be expressed as follows:

$$V_D = \frac{R}{e^{\frac{B}{T_O}} - F} \quad (1)$$

Where $V_D$ represents the measured voltage value measured by the temperature detection device 10, R, B, F and O are radiometric regression coefficients. For example, the radiometric regression coefficient R represents the system response of the received external energy of the temperature detection device 10. The radiometric regression coefficient B represents an absorption spectrum parameter of the temperature detection device 10. The radiometric regression coefficient F represents a nonlinear correction parameter of the temperature detection device 10. The radiometric regression coefficient O represents an offset parameter of the temperature detection device 10. TO represents the actual temperature of the object under test. An inverse function of equation (1) can be expressed as follows:

$$T_O = \frac{B}{\ln\left(\frac{R}{V_D - O} + F\right)} \quad (2)$$

Therefore, the processor circuit 30 substitutes the measured voltage value $V_D$ measured by the temperature detection device 10 and the radiometric regression coefficients determined in Step S204 into equation (2) to calculate the actual temperature $T_O$ of the object under test. In other words, by substituting the electrical signal generated based on the sensed infrared energy sensed by the temperature detection device 10 and the radiometric regression coefficients determined based on the ambient temperature, the temperature of the case 102 and the operation temperature of the FPA module 104 into equation (2), the actual temperature $T_O$ of the object under test can be obtained by calculating the solution of equation (2).

Figure 3:
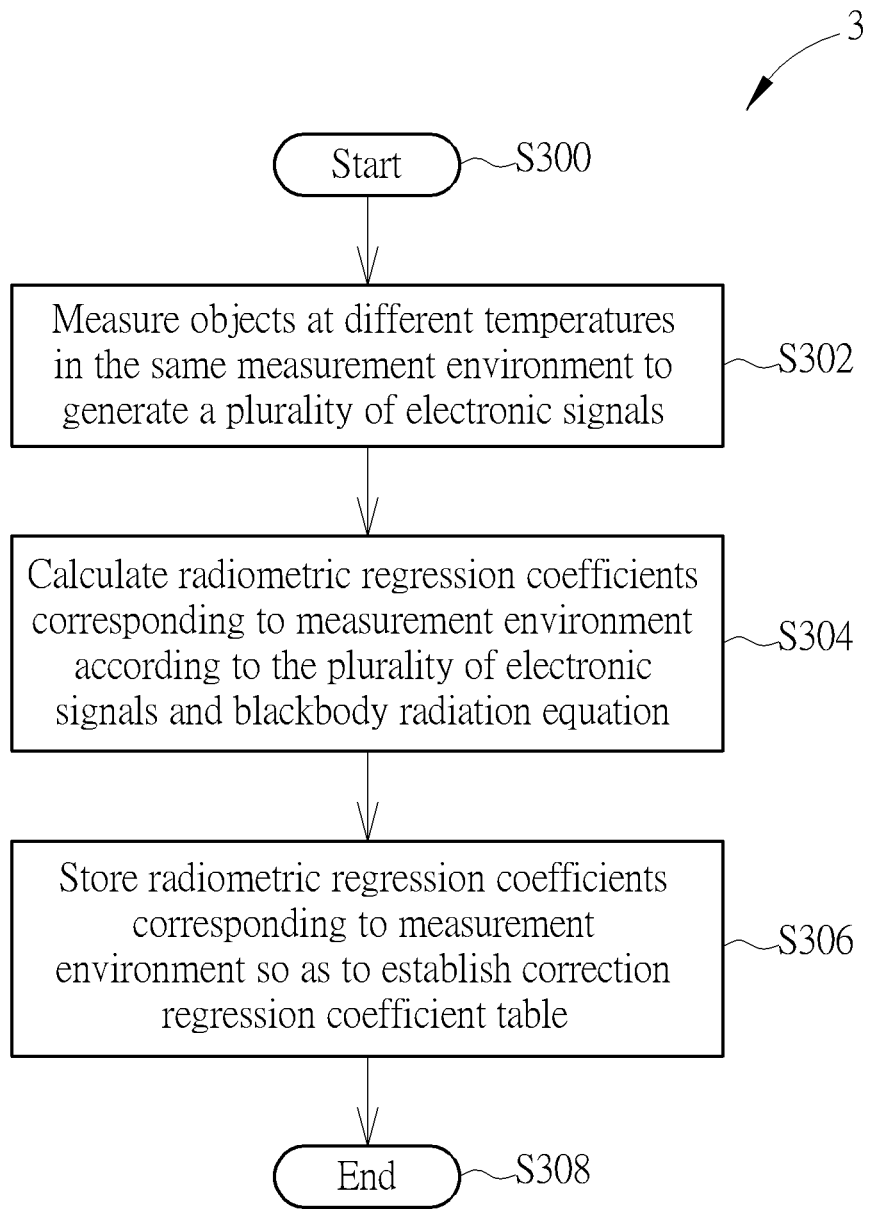
FIG. 3 is a schematic diagram of a generating procedure of a correction regression coefficient table according to an embodiment of the present invention.

The operation of generating a correction regression coefficient table may be summarized as a procedure 3. Please refer to FIG. 3, which is a schematic diagram of a procedure 3 according to an embodiment of the present invention. The procedure 3 includes the following steps:

Step S300: Start.

Step S302: Measure objects at different temperatures in the same measurement environment to generate a plurality of electronic signals.

Step S304: Calculate radiometric regression coefficients corresponding to measurement environment according to the plurality of electronic signals and black body radiation equation.

Step S306: Store radiometric regression coefficients corresponding to measurement environment so as to establish correction regression coefficient table.

Step S308: End.

According to the procedure 3, in Step S302, for establishing a correction regression coefficient table, the temperature detection device 10 is configured to measure objects at different temperatures in the same measurement environment to generate a plurality of electronic signals. The measured electronic signals are provided to the processor circuit 30. Conditions of the measurement environment may include that the ambient temperature is at a first temperature, the temperature of the case 102 is at a second temperature and the operation temperature of the FPA module 104 is at a third temperature. For example, the electronic system 1 operates in a measurement environment that the ambient temperature is $T_{A1}$, the temperature of the case 102 is $T_{C1}$ and the operation temperature of the FPA module 104 is $T_{F1}$, the temperature detection device 10 measures a first object having a temperature of $T_1$ to generate a measured voltage value $V_{D1}$. The electronic system 1 operates in the measurement environment that the ambient temperature is $T_{A1}$, the temperature of the case 102 is $T_{C1}$ and the operation temperature of the FPA module 104 is $T_{F1}$, the temperature detection device 10 measures a second object having a temperature of $T_2$ to generate a measured voltage value $V_{D2}$. The temperature $T_1$ is different from the temperature $T_2$.

In Step S304, the processor circuit 30 calculates the radiometric regression coefficients corresponding to the measurement environment according to the electronic signals measured in Step S302 and a black body radiation equation. For example, since at least one radiometric regression coefficient is a fixed value, the radiometric regression coefficients corresponding to the measurement environment can be calculated by the processor circuit 30 according to equation (1). For example, suppose the radiometric regression coefficients $B_1$ and $F_1$ are fixed values respectively. By substituting the measured voltage value $V_{D1}$ and the temperature $T_1$ of the first object into equation (1), the following equation is obtained:

$$V_{D1} = \frac{R'}{e^{\frac{B_1}{T_1} - F_1}} + O_1' \tag{3}$$

Where R' and $O_1'$ represent the corrected radiometric regression coefficients.

By substituting the measured voltage value $V_{D2}$ and the temperature $T_2$ of the second object into equation (1), the following equation is obtained:

$$V_{D2} = \frac{R'}{e^{\frac{B_1}{T_2} - F_1}} + O_1' \tag{4}$$

Where R' and $O_1'$ represent the corrected radiometric regression coefficients. Since the radiometric regression coefficient $B_1$ and $F_1$ are fixed values and the measured voltage value $V_{D1}$, the temperature $T_1$ of the first object, the measured voltage value $V_{D2}$ and the temperature $T_2$ of the second object are known, the corrected radiometric regression coefficients R' and $O_1'$ can be obtained by calculating the solutions of the simultaneous equations (3) and (4). Please refer to FIG. 4, which is a schematic diagram illustrating a correction regression coefficient table according to an embodiment of the present invention. The processor circuit 30 can set the radiometric regression coefficient $B_1$ and $F_1$ and the corrected radiometric regression coefficients R' and $O_1'$ as the correction radiometric regression coefficients corresponding to the measurement environment since the measurement environment includes the following conditions: the ambient temperature is $T_{A1}$, the temperature of the case 102 is $T_{C1}$ and the operation temperature of the FPA module 104 is $T_{F1}$.

Figure 4:
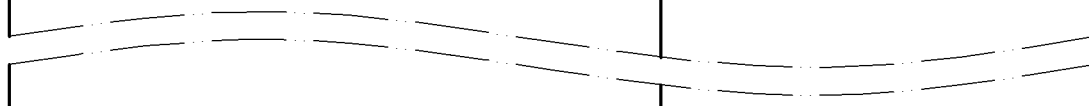
FIG. 4 is a schematic diagram illustrating a correction regression coefficient table according to an embodiment of the present invention.

In Step S306, a correction regression coefficient table can be established according to information of the measurement environment and the corresponding correction radiometric regression coefficients. The processor circuit 30 can store the correction radiometric regression coefficients of each measurement environment into the storage device 40 so as to establish the correction regression coefficient table. The correction regression coefficient table can be stored in a lookup table available in the storage device 40. For example, as shown in FIG. 4, the corresponding correction radiometric regression coefficients can be calculated since the correction radiometric regression coefficient B is a fixed value $B_1$ and the correction radiometric regression coefficient F is a fixed value $F_1$.

In brief, for different measurement environments, the invention can establish correction radiometric regression coefficients corresponding to each measurement environment according to the procedure 3. Each measurement environment has the corresponding correction radiometric regression coefficients. After the correction regression coefficient table is established and stored in the storage device 40, the electronic system 1 can utilize the temperature detection device 10 to measure temperature of the object. In more detail, according to the procedure 2, the temperature detection device 20 measures the ambient temperature, the temperature of the case 102 and the operation temperature of the FPA module 104. The processor circuit 30 query the correction regression coefficient table to obtain the corresponding radiometric regression coefficients corresponding to the ambient temperature, the temperature of the case 102 and the operation temperature of the FPA module 104 measured by the temperature detection device 20. After that, the temperature detection device 10 senses infrared energy radiated from the object under test and generates the corresponding electrical signal. By substituting the measured electrical signal and the obtained radiometric regression coefficients into equation (2), a high accuracy actual temperature of the object under test can be obtained.

In an embodiment, take a narrow temperature range as an example, for example, black body radiation source's temperature range is from 0° C. to 50° C. During establishing the correction regression coefficient table, a planar standard black body radiation source can be utilized as the standard temperature reference for calibration. For example, during establishing the correction regression coefficient table, the black body radiation surface covers the whole field of view of the lens of the temperature detection device 10, the black body radiation source can be adjusted to different temperatures and the black body radiation source is used as the standard temperature reference for calibration. When operating in the measurement environment that the ambient temperature is 19.2° C., the temperature of the case 102 is 23.32° C. and the operation temperature of the FPA module 104 is 22° C., the electronic system 1 performs a high temperature point (45° C.) and a low temperature point (20° C.) measurement for area correction to determine the correction radiometric regression coefficients R, B, F and O. The radiometric regression coefficient R represents the system response of the received external energy of the temperature detection device 10. The radiometric regression coefficient B represents an absorption spectrum parameter of the temperature detection device 10. The radiometric regression coefficient F represents a nonlinear correction parameter of the temperature detection device 10. The radiometric regression coefficient O represents an offset parameter of the temperature detection device 10.

When the black body radiation source is at 20° C., the IR sensors of the FPA 1042 of the temperature detection device 10 sense infrared energy radiated from the black body radiation source and accordingly, the readout circuit 1044 of the temperature detection device 10 generates a corresponding average voltage signal and converts the average voltage signal to an average voltage value $V_{D1}$. For example, the average voltage value $V_{D1}$ is 3109.25 counts@14 bits. Similarly, when the black body radiation source is at 45° C., the IR sensors of the FPA 1042 of the temperature detection device 10 sense infrared energy radiated from the black body radiation source and accordingly, the readout circuit 1044 generates a corresponding average voltage signal and converts the average voltage signal to an average voltage value $V_{D2}$. For example, the average voltage value $V_{D2}$ is 4538 counts@14 bits. In such a situation, by substituting the measured voltage value $V_{D1}$ ($V_{D1}$=3109.25 counts@14 bits) and the temperature $T_1$ ($T_1$=20° C.) into equation (3), substituting the measured voltage value $V_{D2}$ ($V_{D1}$=4538 counts@14 bits) and the temperature $T_2$ ($T_2$=45° C.) into equation (4), setting the correction radiometric regression coefficient B being 1428 and substituting the correction radiometric regression coefficient B (B=1428) into equations (3) and (4), and setting the correction radiometric regression coefficient F being 1 and substituting the correction radiometric regression coefficient F (F=1) into equations (3) and (4), the correction radiometric regression coefficients R and O are obtained by calculating the solutions of the simultaneous equations (3) and (4) for a system of linear equations in two unknowns. As shown in FIG. 5, the correction radiometric regression coefficient R is 392760 and the correction radiometric regression coefficients O is 83.5158.

After that, in the same measurement environment, the black body radiation source is adjusted to 20° C., 30° C., 40° C., 50° C., respectively. According to Step S206 of the procedure 2, the temperature detection device 10 is utilized to sense infrared energy radiated from the black body radiation source and generates the corresponding average voltage values $V_D$ shown in FIG. 5. By substituting the correction radiometric regression coefficients R (R=392760), O (O=83.5158), B (B=1428), F (F=1) and the average voltage values $V_D$ into equation (2), a calculated temperature value is obtained through performing the inverse operation. The calculated temperature value is the actual temperature of the black body radiation source measured by the temperature detection device 10.

In an embodiment, take a wide temperature range as an example, for example, black body radiation source's temperature range is from 0° C. to 500° C. During establishing the correction regression coefficient table, a planar standard black body radiation source can be utilized as the standard temperature reference for calibration. For example, during establishing the correction regression coefficient table, the black body radiation surface covers the whole field of view of the lens of the temperature detection device 10, the black body radiation source can be adjusted to different temperatures and the black body radiation source is used as the standard temperature reference for calibration. When operating in the measurement environment that the ambient temperature is 18.8° C., the temperature of the case 102 is 23.76° C. and the operation temperature of the FPA module 104 is 22.4° C., the electronic system 1 performs a high temperature point (90° C.) and a low temperature point (30° C.) measurement for area correction to determine the correction radiometric regression coefficients R, B, F and O.

When the black body radiation source is at 30° C., the IR sensors of the FPA 1042 of the temperature detection device 10 sense infrared energy radiated from the black body radiation source and accordingly, the readout circuit 1044 generates a corresponding average voltage signal and converts the average voltage signal to an average voltage value $V_{D1}$. For example, the average voltage value $V_{D1}$ is 3794 counts@14 bits. Similarly, when the black body radiation source is at 90° C., the IR sensors of the FPA 1042 of the temperature detection device 10 sense infrared energy radiated from the black body radiation source and accordingly, the readout circuit 1044 generates a corresponding average voltage signal and converts the average voltage signal to an average voltage value $V_{D2}$. For example, the average voltage value $V_{D2}$ is 7480.5 counts@14 bits.

In such a situation, by substituting the measured voltage value $V_{D1}$ ($V_{D1}$=3794 counts@14 bits) and the temperature $T_1$ ($T_1$=30° C.) into equation (3), substituting the measured voltage value $V_{D2}$ ($V_{D1}$=7480.5 counts@14 bits) and the temperature $T_2$ ($T_2$=90° C.) into equation (4), setting the correction radiometric regression coefficient B being 1428 and substituting the correction radiometric regression coefficient B (B=1428) into equations (3) and (4), and setting the correction radiometric regression coefficient F being 1 and substituting the correction radiometric regression coefficient F (F=1) into equations (3) and (4), the correction radiometric regression coefficients R and O are obtained by calculating the solutions of the simultaneous equations (3) and (4) for a system of linear equations in two unknowns. As shown in FIG. 6, the correction radiometric regression coefficient R is 338281 and the correction radiometric regression coefficients O is 729.066.

After that, in the same measurement environment, the black body radiation source is adjusted at 25° C., 50° C., 75° C., 100° C., respectively. According to Step S206 of the procedure 2, the temperature detection device 10 is utilized to sense infrared energy radiated from the black body radiation source and generates the corresponding average voltage values $V_D$ shown in FIG. 6. By substituting the correction radiometric regression coefficients R (R=338281), O (O=729.066), B (B=1428), F (F=1) and the average voltage values $V_D$ into equation (2), a calculated temperature value is obtained through performing the inverse operation. The calculated temperature value is the actual temperature of the black body radiation source measured by the temperature detection device 10.

According to the embodiments of FIGS. 5 and 6, the invention determines the corresponding correction radiometric regression coefficients R, B, F and O according to the ambient temperature, the temperature of the case 102 and the operation temperature of the FPA module 104 for each measurement environment and calculated the actual temperature of the object under test. In fact, it can be verified that the accuracy of the electronic system 1 can be ±0.4° C. and thus having excellent measurement accuracy.

Note that, those skilled in the art should readily make combinations, modifications and/or alterations on the abovementioned description and examples. The abovementioned steps of the procedures including suggested steps can be realized by means that could be hardware, firmware known as a combination of a hardware device and computer instructions and data that reside as read-only software on the hardware device, or a processing system. Examples of hardware can include analog, digital and mixed circuits known as microcircuit, microchip, or silicon chip. Examples of the processing system can include a system on chip (SOC), system in package (SIP), a computer on module (COM), and the processor circuit 30.

In summary, the electronic system 1 of the embodiments can adjust the radiometric regression coefficients according to the ambient temperature, the temperature of the case 102 and the temperature of the FPA module 104 and accordingly calculate an actual temperature value of the object under test, so as to reduce the sensor offset of the temperature detection device 10 and improve the accuracy of measurement. Compared with the conventional measurement offset correction method, the invention does not require additional shutter hardware for implementation and also does not require computing complex equations, thus effectively improving the accuracy of measurement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A temperature measurement correction method, for a temperature detection device, the temperature detection device comprising a case and a focal plane array module disposed on an inner of the case, the temperature measurement correction method comprising:

measuring an ambient temperature, a temperature of the case and an operation temperature of the focal plane array module;

querying a correction regression coefficient table to obtain a first radiometric regression coefficient associated with system response of received external energy of the temperature detection device, a second radiometric regression coefficient associated with an absorption spectrum parameter of the temperature detection device, a third radiometric regression coefficient associated with a nonlinear correction parameter of the temperature detection device and a fourth radiometric regression coefficient associated with an offset parameter of the temperature detection device corresponding to the ambient temperature, the temperature of the case and the operation temperature of the focal plane array module;

utilizing the temperature detection device to sense infrared energy radiated from an object to generate an electrical signal; and calculating an actual temperature value of the object according to the following equation:

$$T_O = \frac{B}{\ln\left(\frac{R}{V_D - O} + F\right)}$$

where TO represents the actual temperature of the object, R represents the first radiometric regression coefficient, B represents the second radiometric regression coefficient, F represents the third radiometric regression coefficient, O represents the fourth radiometric regression coefficient, and VD represents a voltage value of the sensed electrical signal by the temperature detection device.

2. The temperature measurement correction method of claim 1, wherein the correction regression coefficient table is associated with a calculation result calculated based on that one of the first radiometric regression coefficient, the second radiometric regression coefficient, the third radiometric regression coefficient and the fourth radiometric regression coefficient is set to a first fixed value and another one of the first radiometric regression coefficient, the second radiometric regression coefficient, the third radiometric regression coefficient and the fourth radiometric regression coefficient is set to a second fixed value, and voltage values of first electrical signals are generated by the temperature detection device when measuring a first object at different temperatures.

3. The temperature measurement correction method of claim 1, wherein the temperature detection device is a microbolometer-based detection device.

4. The temperature measurement correction method of claim 1, further comprising:

in a measurement environment, utilizing the temperature detection device to measure a first object at different temperatures to generate a plurality of first electronic signals, wherein an ambient temperature of the measurement environment is equal to the measured ambient temperature, a temperature of the case in the measurement environment is equal to the measured temperature of the case and an operation temperature of the focal plane array module in the measurement environment is equal to the measured operation temperature of the focal plane array module;

calculating the first radiometric regression coefficient, the second radiometric regression coefficient, the third radiometric regression coefficient and the fourth radiometric regression coefficient corresponding to the measurement environment according to the plurality of first electronic signals and the equation in claim 1; and storing the first radiometric regression coefficient, the second radiometric regression coefficient, the third radiometric regression coefficient and the fourth radiometric regression coefficient corresponding to the measurement environment, so as to establish the correction regression coefficient table.

5. An electronic system, comprising:

a first temperature detection device, comprising:
  a case; and
  a focal plane array module, disposed on an inner of the case, comprising:
    a focal plane array comprising a plurality of infrared sensors for sensing infrared energy radiated from an object; and
    a readout circuit, for generating an electrical signal in response to the sensed infrared energy sensed by the infrared sensor of the focal plane array;

a second temperature detection device, for measuring an ambient temperature, a temperature of the case and an operation temperature of the focal plane array module; and a processor circuit, for determining a plurality of radiometric regression coefficients according to the ambient temperature, the temperature of the case and the operation temperature of the focal plane array module and calculating an actual temperature value of the object according to the plurality of radiometric regression coefficients and the electrical signal.

6. The electronic system of claim 5, wherein the processor circuit queries a correction regression coefficient table to obtain the plurality of radiometric regression coefficients corresponding to the ambient temperature, the temperature of the case and the operation temperature of the focal plane array module.

7. The electronic system of claim 5, wherein the temperature detection device is a microbolometer-based detection device and the infrared sensor is a microbolometer sensor.

8. A method of generating a correction regression coefficient table, for a temperature detection device, the temperature detection device comprising a case and a focal plane array module disposed on an inner of the case, the method comprising:

in a measurement environment, utilizing the temperature detection device to measure an object at different temperatures to generate a plurality of electronic signal, wherein an ambient temperature of the measurement environment is at a first temperature, a temperature of the case in the measurement environment is at a second temperature and an operation temperature of the focal plane array module in the measurement environment is at a third temperature;

calculating a first radiometric regression coefficient, a second radiometric regression coefficient, a third radiometric regression coefficient and a fourth radiometric regression coefficient corresponding to the measurement environment according to the plurality of electronic signals and a Planck curve approximate equation; and storing the first radiometric regression coefficient, the second radiometric regression coefficient, the third radiometric regression coefficient and the fourth radiometric regression coefficient corresponding to the measurement environment, so as to establish the correction regression coefficient table.

9. The method of claim 8, wherein the step of calculating the first radiometric regression coefficient, the second radiometric regression coefficient, the third radiometric regression coefficient and the fourth radiometric regression coefficient corresponding to the measurement environment according to the plurality of electronic signals and the Planck curve approximate equation comprises:

calculating the first radiometric regression coefficient, the second radiometric regression coefficient, the third radiometric regression coefficient and the fourth radiometric regression coefficient corresponding to the measurement environment according to the electronic signals and the Planck curve approximate equation since one of the first radiometric regression coefficient, the second radiometric regression coefficient, the third radiometric regression coefficient and the fourth radiometric regression coefficient is set to a first fixed value and another one of the first radiometric regression coefficient, the second radiometric regression coefficient, the third radiometric regression coefficient and the fourth radiometric regression coefficient is set to a second fixed value.

10. The method of claim 8, wherein the temperature detection device is a microbolometer-based detection device.

* * * * *